United States Patent [19]
Gill

[11] Patent Number: 5,868,441
[45] Date of Patent: *Feb. 9, 1999

[54] ROTATABLY LOCKING PIPE COUPLING ASSEMBLY

[76] Inventor: Ajit Singh Gill, 4169 Bennion Rd., Salt Lake City, Utah 84119

[ * ] Notice: The term of this patent shall not extend beyond the expiration date of Pat. No. 5,387,017.

[21] Appl. No.: 732,503

[22] PCT Filed: Jan. 9, 1995

Related U.S. Application Data

[63] Continuation-in-part of PCT/US94/05319 May 13, 1994.

[86] PCT No.: PCT/US95/00304

§ 371 Date: Nov. 13, 1996

§ 102(e) Date: Nov. 13, 1996

[87] PCT Pub. No.: WO95/31668

PCT Pub. Date: Nov. 23, 1995

[51] Int. Cl.[6] ...................................................... F16L 21/06
[52] U.S. Cl. .......................... 285/322; 285/420; 285/314; 285/394
[58] Field of Search .................................... 285/322, 420, 285/314, 394, 309, 310, 112

[56] References Cited

U.S. PATENT DOCUMENTS

| | | | |
|---|---|---|---|
| 4,305,607 | 12/1981 | Westerlund et al. | 285/112 X |
| 4,326,737 | 4/1982 | Lehmann | 285/112 |
| 5,387,017 | 2/1995 | Gill | 285/322 |

*Primary Examiner*—Heather Shackelford
*Attorney, Agent, or Firm*—Mallinckrodt & Mallinckrodt

[57] ABSTRACT

A coupling for attachment to the end portion of a pipe (1) having circumferentially directed shoulder (3a) in such end portion includes a coupling body (6) which receives the end portion of the pipe (1) therein and a set of jaw members (24E–27E) which, after the end portion of the pipe (1) is received in the coupling body (6), move to a closed position to engage the shoulder (3a) so that the coupling is locked onto the end of the pipe (1) and the pipe cannot be pulled from the coupling because the jaw members (24E–27E) acting against the shoulder (3a) prevent such movement. The coupling can be provided with sets of jaw members (24E–27E) at each end to couple together two pipes (1, 2) each with end portion shoulders (3a, 4a) or have jaw members at one end and conventional connectors such as threads (64, FIG. 6), ridged inserts (121, FIG. 12), flanges, or other types of connectors at the other end. Valves (FIG. 5) or other fittings may be incorporated into the coupling.

20 Claims, 6 Drawing Sheets

ROTATABLY LOCKING PIPE COUPLING ASSEMBLY

BACKGROUND OF THE INVENTION

1. Field

The invention is in the field of attachments and couplings for the ends of pipe wherein the end portion of a pipe to be coupled to or attached to has a circumferential shoulder inwardly from the end of the pipe, usually formed by a circumferential groove in the pipe, which mates with the attachment or coupling to secure it to the pipe and prevent axial movement of the pipe with respect to the attachment or coupling.

2. State of the Art

There are many ways of attaching pipes to valves, connectors or other fittings and for coupling the ends of pipe together. It is common to provide screw threads on the ends of pipes with mating screw threads on valves, connectors, or other fittings, or to connect threaded ends of pipe together with a threaded coupling. With plastic pipe, the various fittings may slide over the outside of the pipe and be glued into place or slide into the end of the pipe and be clamped into place.

It has also become common in some applications to provide grooves in the end portions of pipe to be connected together and to then connect the pipes with a clamp having flanges or keys which fit into the grooves to restrain axial movement of the pipes. Rather that fitting into a groove in the end portions of the pipes, these couplings can also fit against the side of a raised shoulder or bead at the end of a pipe. Such fittings are sold by Victaulic Company of America, Easton, Pa. and are shown in U.S. Pat. Nos. 3,695,638; 3,761,114; 4,471,979; 4,561,678; 4,522,434; 4,611,839; 4,639,020; and 4,896,902. Generally these couplings extend between and engage the grooves on the ends of pipe to be joined end-to-end with a gasket held by the coupling around the abutting ends of the pipe to prevent leakage therefrom. The couplings are generally formed of two arcuate pieces, each adapted to extend circumferentially around half the pipe with the pieces joined and tightened or clamped around the pipe by bolts extending through outwardly extending bolt pads. With such attachment, the bolts securing the arcuate pieces of the coupling together around the pipe constrain the pressure of the fluid flowing in the pipe. Also, if the pieces of the coupling do not come completely together because of normal variations in the outside diameter of the pipes being joined, the sealing gasket may be left exposed or uncovered between the pieces which can result in extrusion of the gasket between the pieces and possible leakage. Placement of the coupling pieces over the pipe ends to join the pipes requires both pipe ends to be held in substantially exact position with the pipes aligned end-to-end and with grooves properly spaced to receive the keys or flanges of the coupling pieces as the coupling pieces are placed around the pipes and tightened therearound. This will usually require two workmen to accomplish. While such couplings usually extend between the grooves of pipes to be joined, in some instances, such as shown in U.S. Pat. No. 3,761,114, one of the pipes to be joined has the groove formed in the end portion thereof and the coupling engages the groove of that pipe end and is joined in more conventional manner, such as by a flange attachment, to the other pipe end, or to some type of pipe fitting. Still, however, the couplings are in two pieces joined by bolts, and require assembly in the field.

SUMMARY OF THE INVENTION

According to the invention, a coupling for attachment to the end of a pipe having a circumferential shoulder includes a coupling body with a receiving opening therein so that the coupling body closely receives and surrounds the end portion of a pipe to be coupled. A set of jaw members is mounted on the coupling body around the receiving opening for movement toward or away from a pipe received in the body. When the jaw members of the set are moved toward the pipe to a closed position, they engage the shoulder on the pipe to secure the coupling body to the pipe. When the jaw members of the set are moved away from the pipe to an open position, they disengage the shoulder so the coupling can be removed from the end portion of the pipe. The coupling may be used to secure a pipe to a valve or other fitting, or to join pipes together in end-to-end relationship. When joining pipes together, when both pipes to be joined have end portion shoulders, the coupling is provided with a second set of jaw members movable between an open and closed position for engaging or releasing the shoulder of a second pipe to be joined to a first pipe. The set of jaw members may be operable independently of the second set of jaw members in which case the coupling may be easily attached first to the end of one pipe and then to the other pipe. This can usually be done by a single workman. If both sets of jaw members are operable together, the pipes must be properly spaced with the coupling thereon before the jaw members of the two sets are operated simultaneously to move them to closed position. However, even in such case, since the ends of each of the pipes to be joined are received in the coupling body, and thus held in alignment by the coupling body, proper spacing of the pipes can usually be handled by a single workman.

The shoulder in the end portion of the pipe is generally formed by forming a groove in the end portion of the pipe so that the side of the groove closest the pipe end forms the shoulder. However, the shoulder may be formed by a raised bead in the end portion of the pipe wherein generally the side of the bead away from the end of the pipe forms the shoulder. The shoulder does not have to be continuous in order to operate with the attachment of the invention.

The jaw members of a set of jaw members will generally be mounted on an end of the coupling body around the receiving opening therein and in a preferred embodiment of the invention, are mounted for limited movement with respect to the coupling body around the central axis of the receiving opening. This provides circumferential movement of the jaw members partially around the end portions of a pipe received in the coupling. The jaw members include camming surfaces which mate with camming surfaces of the coupling body so that as the jaw members move around the receiving opening in one direction, they also move to closed position, and as they move around the receiving opening in the opposite direction, they move to open position. With such arrangement, the jaw members may be easily moved by a user between open and closed positions. The camming surfaces of the jaw members may take the form of bolts or pins extending through the jaw members into receiving slots in the coupling body which form the mating camming surfaces of the coupling body. Although not generally necessary, means may be provided for locking the jaw members in closed position.

In a preferred form of the invention, each jaw member of a set of jaw members is of substantially U-shape and includes a flat jaw piece forming one leg of the "U", a laterally spaced flange forming the other leg of the "U" and shorter than the jaw piece, and a transversely extending connector connecting the jaw piece and flange and forming the connecting portion of the "U". The flange is received and held by the coupling body and serves to hold the jaw member in place with respect to the coupling body. Where the coupling is to be used to join two pipes together in end-to-end relationship, the coupling body is cylindrical having flat opposite ends and having a cylindrical opening therethrough which closely receives the end portions of the two pipes to be joined, the ends of the two pipes being within the coupling body. The outer surface of the coupling body has a centrally located circumferential channel therearound which creates opposite end collars on the coupling body. A set of jaw member is mounted at each end of the coupling body. The jaw members of each set of jaw members are positioned around the coupling body opening, one set at one end of the coupling body and the other set at the other end so that when a flat jaw piece of a jaw member is against an end of the coupling body, the associated flange is against the side of the centrally located circumferential channel closest to the flat jaw piece. This positions the jaw members so that a coupling body end collar extends between the legs of the U-shaped jaw members, i.e. between the flat jaw piece and the jaw member flange, to prevent relative axial movement of the jaw members with respect to the coupling body. Each end of the coupling body has a plurality of slots therein, the number of such slots being at least equal to the number of jaw members in a set of jaw members, and preferably twice the number of jaw members in a set of jaw members, and at least one bolt, preferably two bolts, extends through each jaw piece with the end thereof extending into a slot for sliding movement along the slot. The bolts extending into the slots, in conjunction with the flanges, secure the jaw members to the coupling body, and the bolts extending into the slots limit the movement of the jaw members to movement allowed as the bolts slide in the slots. The slots are preferably curved with the curves such that the jaw pieces may be moved a limited distance around the body opening, the extent of movement being determined by the length of the slots, and as the movement along the slots takes place, the jaw pieces move between open and closed positions. Alternately, the slots could be straight, and positioned at an angle to similarly cause the inward and outward movement of the jaw pieces as the jaw pieces slide along the slots. When the pipes are received in the coupling body and the body positioned to extend between the shoulders of the respective pipes, the jaw members of each set are moved to closed position to secure the coupling to the pipe end portions. Gaskets are provided in the coupling body opening to prevent leakage of fluid flowing through the joined pipes.

THE DRAWINGS

The best mode presently contemplated for carrying out the invention is illustrated in the accompanying drawings, in which:

FIG. 1 is a longitudinal vertical section taken through a coupling of the invention used for joining two pipes in end-to-end relationship and showing the end portions of the two joined pipes;

FIG. 2, a transverse vertical section of the coupling of FIG. 1 taken on the line 2—2 of FIG. 1;

FIG. 3, a transverse vertical section of the coupling of FIG. 1 taken on the line 3—3 of FIG. 1;

FIG. 4, an elevation of a set of jaw members arranged as they would be around an end of the coupling shown in FIGS. 1–3, but not showing other parts of the coupling, and with the gaps between the jaw members exaggerated;

FIG. 5, a longitudinal vertical section taken through a coupling of the invention showing an embodiment of the coupling included as part of a valve connected between the ends of two pipes;

FIG. 6, a longitudinal vertical section taken through a coupling of the invention showing an embodiment thereof to mate a pipe having a grooved end to a pipe with a threaded end;

FIG. 7, a longitudinal vertical section similar to that of FIG. 1, but showing a further embodiment of the invention;

FIG. 8, a side elevation of a coupling of the invention showing a locking means;

FIG. 9, a side elevation of a coupling of the invention showing an alternate embodiment of means to open and close the jaw members;

FIG. 10, a top plan view of the coupling of FIG. 9;

FIG. 11, a longitudinal vertical section through a coupling showing a further embodiment of the invention;

FIG. 12, a longitudinal vertical section through a coupling showing a still further embodiment of the invention;

FIG. 13, an end elevation of a coupling of the invention showing spring biasing of the jaw members; and FIG. 14, an enlarged transverse section through the adjustment bolt and its mounting of FIG. 8, rotated 90 degrees, and not showing other parts of the coupling.

DETAILED DESCRIPTION OF THE ILLUSTRATED EMBODIMENT

Figure 1:
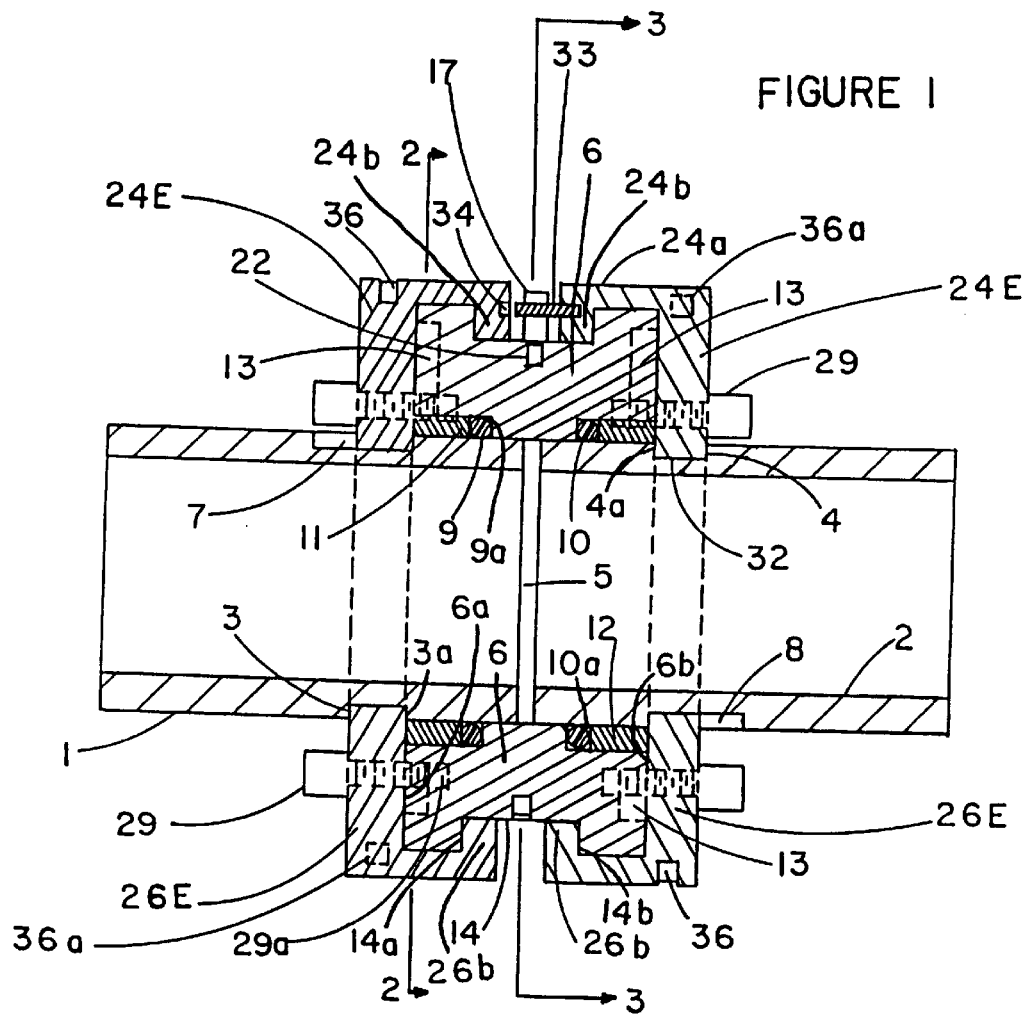
Figure 2:
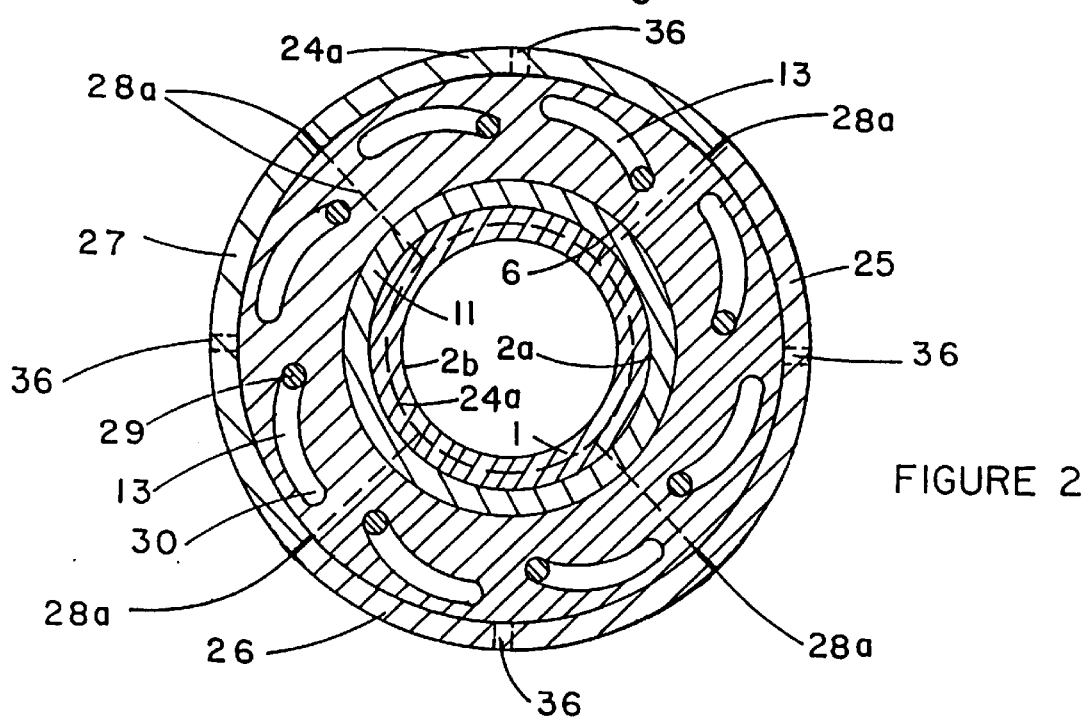
Figure 3:
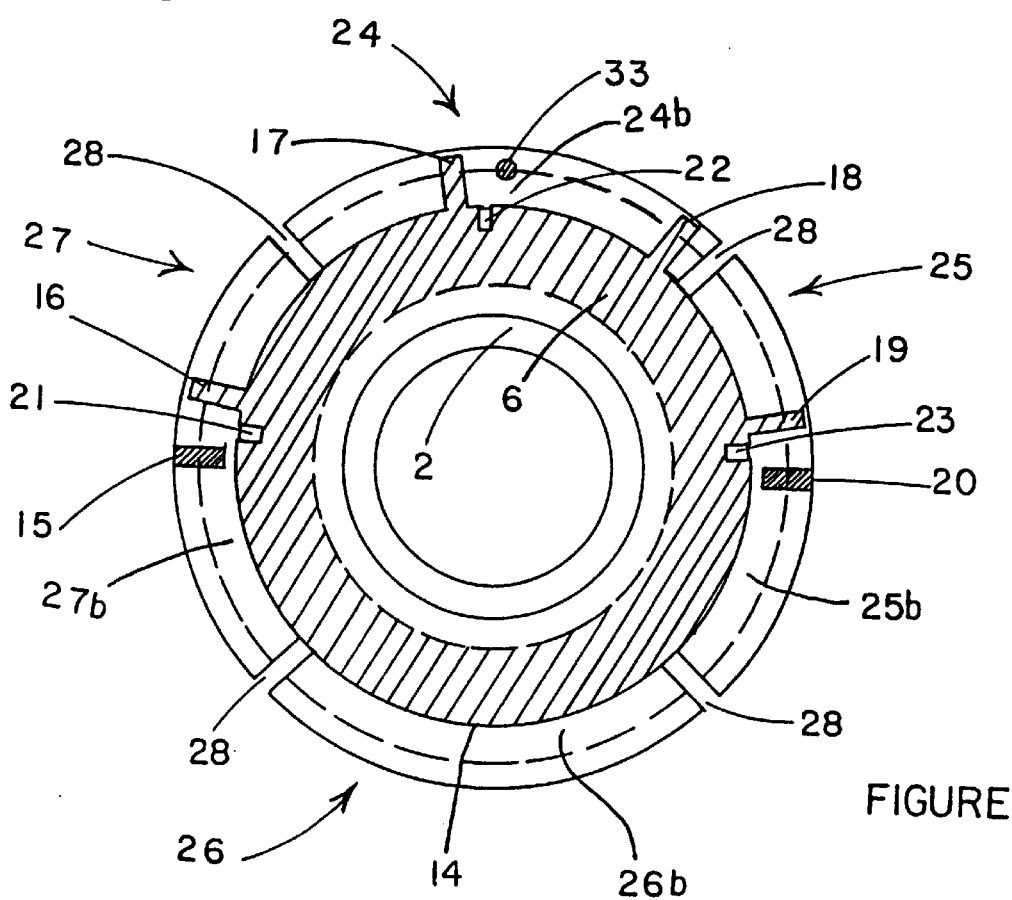

As shown in FIGS. 1 through 3, the invention may take the form of a coupling for joining the ends of two pipes together in end-to-end relationship. Pipes 1 and 2, FIG. 1, are provided with circumferential grooves 3 and 4, respectively, in the respective end portions of the pipes. The side of the groove 3 closest the end of pipe 1 forms a shoulder 3a, while the side of the groove 4 closest the end of pipe 2 forms a shoulder 4a. The coupling of the invention includes a cylindrical coupling body 6 of a length to extend between shoulder 3a in the end portion of pipe 1 and shoulder 4a in the end portion of pipe 2 when the ends of pipes 1 and 2 are received in cylindrical receiving opening 5 within coupling body 6. Coupling body 6 bridges the ends of the pipes 1 and 2 to be joined and is made of a material to withstand the maximum pressure of any fluid expected to flow through the pipes. The ends 6a and 6b of the coupling body 6 are substantially flat and are provided with a plurality of curved slots 13, FIG. 2. The slots may be formed in a solid coupling body, as shown, or may be formed in rings which are attached to and become part of the ends of the coupling body. A circumferential channel 14, FIGS. 1 and 3, extends into the outer surface of coupling body 6 intermediate its length, preferably centered along the length of coupling body 6, as shown in FIG. 1. This forms end collars at the opposite ends of the coupling body.

Figure 4:
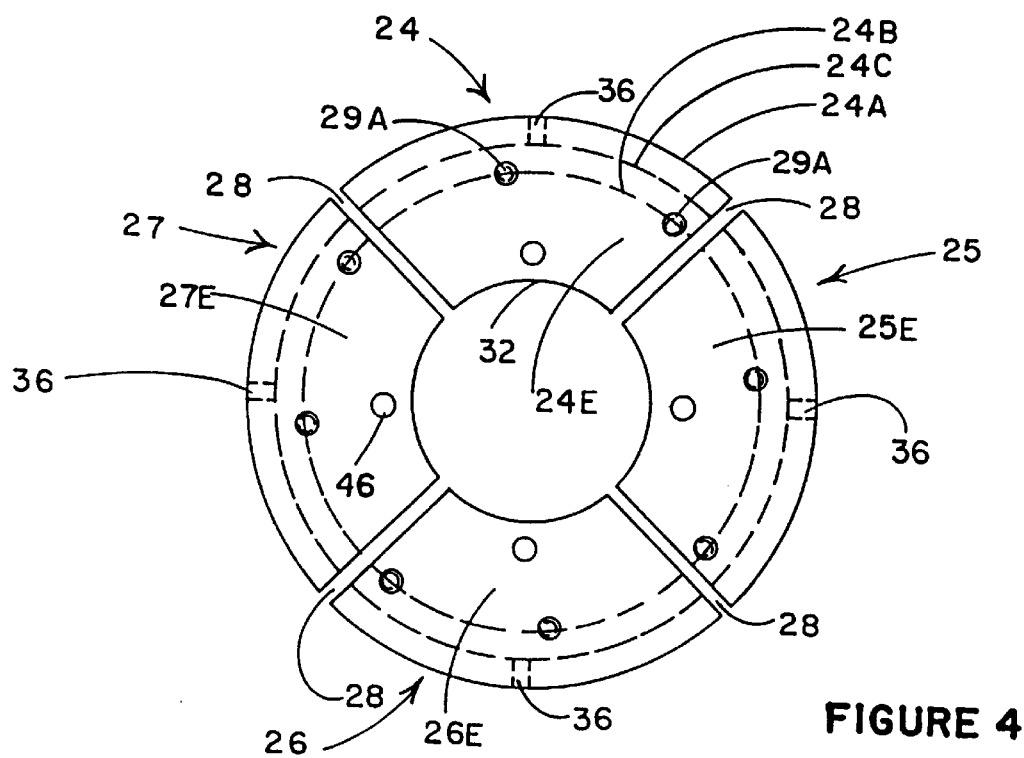

Two sets of substantially U-shaped jaw members, here each set is shown as including four jaw members 24, 25, 26, and 27, FIG. 4, are similarly arranged around opposite ends 6a and 6b of coupling body 6, FIG. 1. Each jaw member is made up of a flat jaw piece 24E, 25E, 26E, and 27E (24E and 26E are shown in FIG. 1) which is positioned against the end 6a or 6b of the coupling body, a laterally spaced, parallel flange 24b, 25b, 26b, and 27b, which is positioned against the wall of channel 14 toward the end of the coupling body against which the respective flat jaw piece is positioned, and a connector 24a, 25a, 26a, and 27a, which joins the jaw piece and the flange. The flat jaw piece, flange, and connector may be integrally formed, or may be made up of separate pieces secured together, such as by welding. In FIG. 4, 24A is the outside edge of the jaw member, 24C is the inside edge of the connector 24a, and 24B is the inside edge of the flange 24b. With a jaw piece against the end of the coupling body and its attached flange against the side of the channel, as shown in FIG. 1 for jaw members 24 and 26, the jaw member is positioned over a coupling body end collar and is securely held against axial movement relative to the coupling body. The only way the jaw member can be removed from the coupling body is by moving it radially outwardly until the flange no longer contacts the wall of the channel.

To limit and control the radial movement of the jaw members with respect to the coupling body, each jaw piece has a pair of bolts 29, FIG. 1, threaded through holes 29A, FIG. 4. The bolts are positioned so that the ends of the bolts extend through the jaw pieces and are received for sliding movement in slots 13 in each end of the coupling body. In this manner, movement of a jaw member is limited to movement of the bolts in the receiving slots. As shown in FIG. 2, the slots are elongate and have one end closer to the center of the coupling body than the other end. Thus, as the bolts slide in one direction along the slots, the bolts, and the jaw member attached to the bolts, move to a closed position closer to the center of the coupling body, i.e., the jaws will move toward a pipe received in the coupling body. As the bolts slide in the opposite direction along the slots, the bolts, and the jaw members attached to the bolts, move to an open position farther from the center of the coupling body, i.e., the jaws will move away from a pipe received in the coupling body. In effect, the slots form a camming surface on the coupling body upon which the bolts, which form mating camming surfaces on the jaw members, will slide. In moving or sliding along the slots, the jaw members will move in an arcuate manner around the receiving opening 5 in the coupling body and any pipe received therein. With the arrangement of slots as shown in FIG. 2, as the jaw members as shown in FIG. 4 are moved in a clockwise direction, the jaw members move simultaneously both circumferentially in a clockwise direction and radially inwardly to a closed position wherein the jaw members extend into the groove in a pipe received in the coupling to attach the coupling to the pipe. The bolts 29 are shown in FIG. 2 at the limit of clockwise travel in the slots, and the jaw pieces are shown in FIGS. 1 and 4 in the corresponding closed position. When the jaw members are moved in a counterclockwise direction, they move simultaneously both circumferentially in a counterclockwise direction and radially outwardly to the open position, wherein a pipe is free to move into or out of the receiving opening 5 in the coupling body. The gaps or spaces 28 between jaw members shown in FIG. 4 are exaggerated for purposes of illustrations, and when the jaw members are in closed condition, the gaps will normally be substantially closed. With small gaps, one of the jaw members can be moved along its slot and the other jaw member will be pushed along their slots by contact with the jaw member being moved.

To aid in moving the sets of jaw members, body 6 may be provided with radially projecting tabs 16, 17, 18, and 19, FIGS. 1 and 3, while axially projecting tabs 15 and 20, FIG. 3, extend from jaw member flanges 25b and 27b. A lever may be inserted between tabs 15 and 16 or 19 and 20 and used to move the jaw members relative to the coupling body. In addition to or rather than tabs 15 and 20 extending from jaw member flanges 25b and 27b, a bar 33, FIGS. 1 and 3, may be provided to extend from a receiving hole 34 in one of the flanges 24b. This is used similarly to tabs 15 and 20, i.e., a lever is placed between tab 17 projecting from coupling body 6 and bar 33, and using bar 33 as a fulcrum for the lever, the jaw members can be easily rotated. With receiving holes 34 located in flanges 24b at opposite sides of channel 14, as shown in FIG. 1, bar 33 can be coupled to one or the other of the opposite flanges, or can be inserted to hold both flanges at once so that both sets of jaw members can be rotated simultaneously, if desired.

In addition, or alternatively, coupling body 6 may be provided with blind holes 21, 22, and 23, FIGS. 1 and 3, in the bottom of channel 14, and the jaw members may each be provided with a blind hole 36 in the top thereof, FIGS. 1 and 2. By placing a rod in one of the holes 21, 22, or 23, and another rod in one of the holes 36, the rods can be pulled or pushed relative to one-another to rotate the respective sets of jaws relative to the coupling body.

While the construction of the coupling shown with channel 14 in the coupling body and a separate set of jaw members as described for each end of the coupling is currently preferred because each set of jaw members can be operated separately, the flanges of each of the jaw members could be eliminated and the connector extended to connect jaw pieces at opposite ends of the coupling body, i.e., to extend from a jaw piece at one end of the coupling body to a jaw piece at the other end of the coupling body to thereby bridge the coupling body. For example, with reference to FIG. 1, flanges 24b could be eliminated and connectors 24a joined so that jaw pieces 24E on each side of coupling body 6 are connected by a single connector 24a. In such case, channel 14 in coupling body 6 is not necessary. With such construction, the jaws on both ends of the coupling body are formed of a single U-shaped jaw member and operate together. If such construction is used, elongate slots 7 and 8 may be provided in pipes 1 and 2, respectively, and a lever inserted into one or the other of the slots and used to move the adjacent bolt 29 to thereby easily move the jaw members between open and closed positions.

To prevent leakage of fluid from the joined pipes, the coupling body will include sealing means, such as O-ring seals 9 and 10 within receiving grooves in coupling body 6, which seal against the end portions of the joined pipes 1 and 2. As shown in FIG. 1, coupling body 6 has circumferential end grooves 9a and 10a which receive O-rings 9 and 10, respectively, which are held in place by end rings 11 and 12 inserted into end grooves 9a and 10a, respectively. While O-ring seals are shown, various other seals and other placements of the seals around the end portions of the pipes could be used.

While generally not necessary since once installed there are no rotational forces on the jaw members to move them from closed to open position, as a safety measure, or in locations where vibration is likely to occur, some type of locking means may be provided to lock the sets of jaw members in closed position. Such locking may be provided by deepening the ends of slots 13 at the ends of the slots representing closed position, i.e., the ends of the slots in which bolts 29 are shown in FIG. 2 extend further into coupling body 6 then the remaining portion of slots 13. This extended opening is shown as 29a in FIG. 1. Bolts 29 are made long enough so that during movement of the jaw members the bolts are only partially threaded through the jaw pieces. When the jaw pieces are in closed position, bolts 29 are rotated so they extend farther through the jaw pieces and extend into the deepened ends 29a of slots 13. This locks the set of jaw members in closed condition. It should be noted that it is only necessary to provide one slot 13 with deepened end 29a and one longer bolt 29 in that particular slot. Locking a single jaw member will lock all jaw members of that set.

Figure 6:
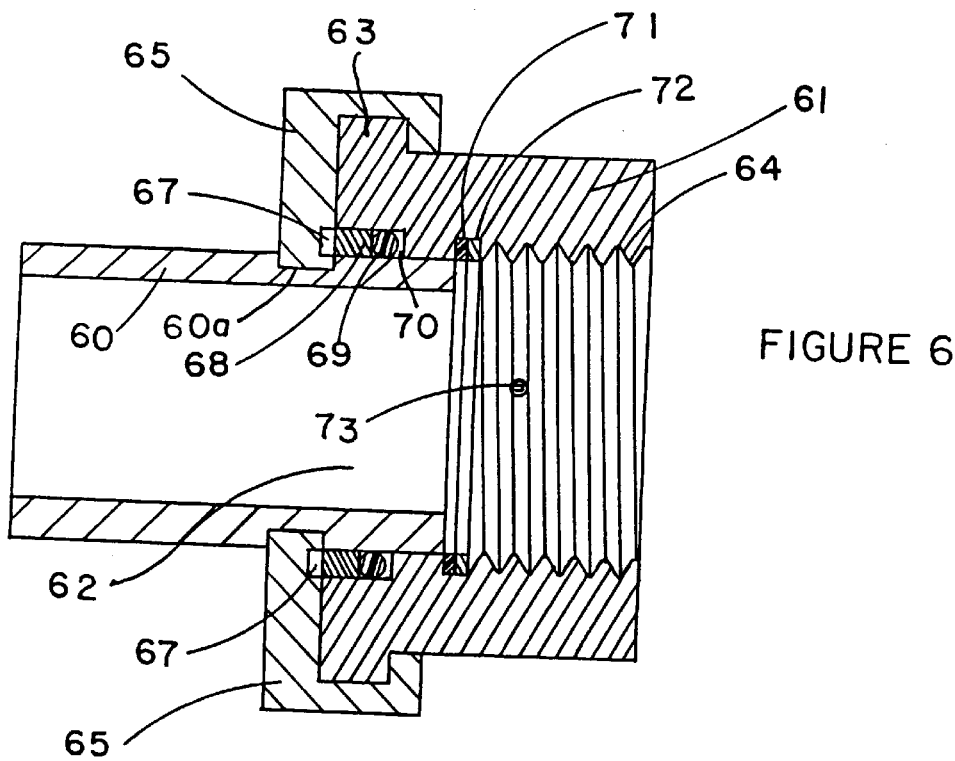

Alternately, a pressure activated locking system could be used. Such a system is shown in FIG. 6 which shows a coupling of the invention which couples the end of pipe 60 having a groove 60a to a pipe or other fitting, not shown, having a threaded end. As shown, the coupling of FIG. 6 has a coupling body 61 with an opening 62 for receiving the end portion of pipe 60 therein at one end, with an end collar 63 around that end, and a threaded, pipe receiving opening 64 at the other end. A set of U-shaped jaw members 65, similar to the jaw members 24, 25, 26, and 27 of FIGS. 1–4, are positioned over the end collar 63 with bolts, not shown, extending through respective jaw members 65 into receiving slots, not shown, in the coupling body similarly to that described for the embodiment of FIGS. 1–4. In this case, however, each of the jaw members 65 have an internal groove 67 which can receive an end of ring 68 therein. Ring 68 and O-ring seal 69 are received in circumferential groove 70 of coupling body 61.

In use, coupling body 61 is screwed onto the end of a pipe or fitting having male threads thereon. The pipe or fitting is sealed by seal 71 and ring 72. The pipe may be locked in place by a set screw inserted through hole 73. A pipe 60, with a standard end portion groove 60a, is inserted into opening 62 of the coupling body 61 and jaw members 65 are moved to closed position as described for the embodiment of FIGS. 1–4. O-ring 69 seals around pipe 60. When a pressurized fluid flows through the pipes or fittings joined by the coupling, the pressure of the fluid acting on seal 69 slides ring 68 outwardly into groove 67 in jaw members 65. This locks the jaw members in closed position. Openings through the jaw members, such as openings 46 shown in FIG. 4 may be provided through jaw members 65 for the insertion of a rod or other tool to push ring 68 out of groove 67 when it is desired to open jaw members 65.

While FIG. 6 shows a coupling between a pipe with end portion groove and a pipe with screw threads, the coupling could be constructed to couple a pipe with end portion groove to any other type of pipe or fitting, such as one with flanges rather than screw threads.

Various locking means other than those specifically described could be used such as a screw that would be threaded into the coupling body adjacent a bar, such as bar 33, FIGS. 1 and 3, when the jaws are in closed position to hold the bar in that position to thereby lock the jaws in closed position. It is also possible to configure such a screw, or to configure a bolt such as a bolt 29 where it would extend into the extended or deepened hole 29a, so that it will urge the jaw members toward the pipe as the screw or bolt is tightened to tighten the jaw members against the pipe.

Figure 5:
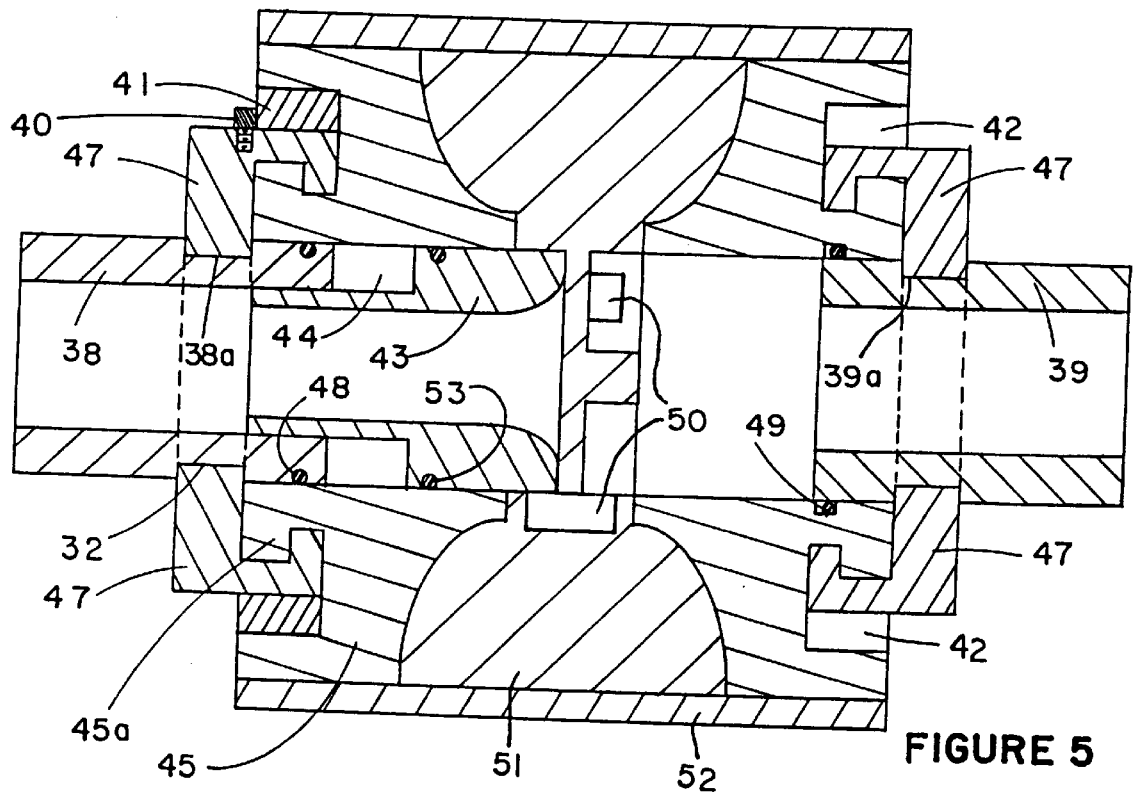

FIG. 5 shows the coupling of the invention built into a valve. The coupling body 45 also provides the valve body. Jaw members 47, similar to jaw members 24, 25, 26, and 27, fit into recess 42 around end collar 45a of coupling body 45. Slots similar to slots 13, FIG. 2, may be provided in the ends of the body and bolts, not shown, extend through jaw members 47 into the slots as described. The jaw members 47 operate as previously described. The end portions of pipes 38 and 39 are inserted into body 45 and the jaw members 47 moved to closed position to engage grooves 38a and 39a. O-rings 48 and 49 seal between the pipe ends and the valve body. To lock the jaw members in closed position, a ring 41 can be inserted in recess 42 and bolt 40 threaded into one of the jaw members 47 to hold it in place. Either of pipes 38 or 39 may be a short stub pipe with groove, flange, or other coupling means at its end away from the valve so that it can serve as a connector stub to allow for easy removal of the valve, if necessary.

The valve could be of any type with a hydraulic valve similar to that shown in my U.S. Pat. Nos. 5,060,691 and 5,069,248 being shown somewhat schematically.

A series of flow passages 50 extend through a partition means 51. A cover 52 extends around the outside of the valve. A gate 43 is positioned in one side of the valve to slide along the inside of the valve body and inside of pipe 38. An O-ring 53 seals the gate where it contacts the inside of the valve body. Pressurized fluid in space 44 between the gate 43 and end of pipe 38 will cause the gate to move to closed position as shown in FIG. 5 wherein the gate 43 covers flow passages 50 to thereby close the valve. The position of gate 43 between the closed position shown, and an open position wherein the gate slides to the left toward pipe 38 in FIG. 5 is controlled by controlling the pressure of the fluid in space 44, as described in the referenced Patents.

While a valve is shown in FIG. 5 between the ends of pipes 38 and 39, various other types of fittings could be provided. Thus, the coupling body could be configured to provide a tee-coupling, Y-coupling, reducer, or various other standard pipe fittings.

Further, while the shoulder has been illustrated as formed by a groove in the end portion of the pipes and the jaws shown as engaging the groove, the shoulder could be formed by a flange on the end of the pipe or by a raised bead around the end portion of the pipe. The shoulder does not have to be continuous, although a continuous shoulder is currently preferred to provide maximum strength.

Figure 7:
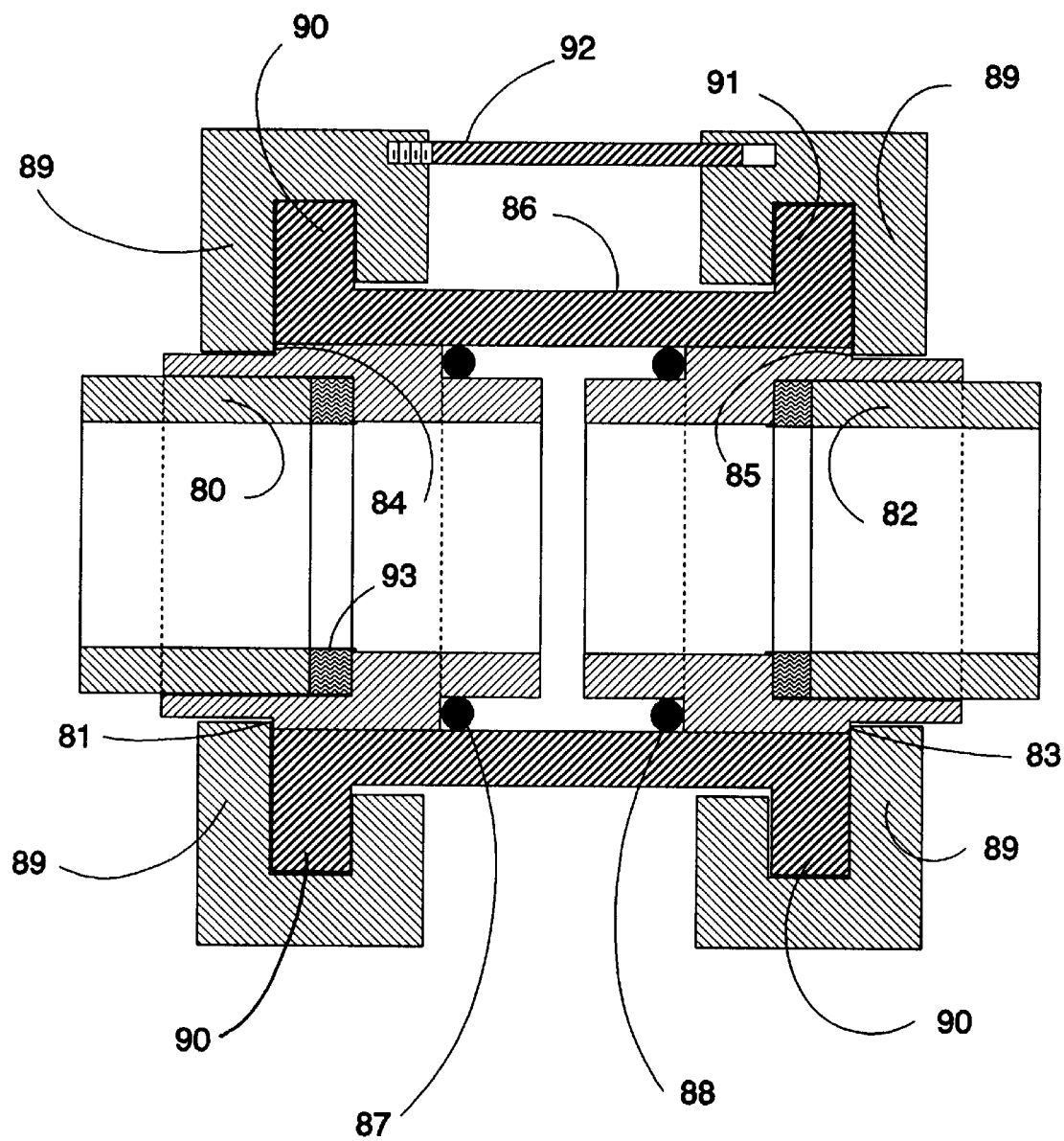

FIG. 7 shows an example of the invention used to join pipe 80 having flange 81 secured to the end thereof to pipe 82 having flange 83 secured to the end thereof. The flanges 81 and 83 form shoulders 84 and 85, respectively. Coupling body 86 slips over flanges 81 and 83 with a seal provided by O-rings 87 and 88. Sets of U-shaped jaw members 89 fit over collars 90 and 91 at opposite ends of coupling body 86. The jaw members will be mounted on coupling body 86 and will operate as described for previous embodiments. A bar 92 can be secured between jaw members at opposite ends of the coupling body 86 so that the jaw members can be operated simultaneously as previously described. Rather than one or more bars 92 extending between opposite jaw members, the jaw members could be joined by an integral web extending between them so that opposite jaw members would constitute a single integral jaw.

The flanges 81 and 83 may be made of various materials to be used with pipes of various materials and may be secured to the ends of the pipe in various ways. For steel pipes and flanges, a flange may be welded onto the end of a pipe with a weld such as shown at 93, or with plastic pipes and flanges, a flange may be glued to a pipe. Alternately, the flange and pipe could be threaded and the flange screwed onto the end of the pipe. Also, the flanges may take various configurations. For example, a flange may slip over the end of a pipe as a sleeve and be positioned even with the end of the pipe, or may extend beyond the end of the pipe, as shown, to become an extension of the pipe and, in effect, the end of the pipe. The shoulder formed by the flange may, as shown, extend only partially into the flange, or may extend to the pipe and form the end of the flange. If thin wall or weak wall pipe is being joined, it may be advantageous to provide a flange which reinforces the end of the pipe and with a groove therein to form the shoulder or with the shoulder formed as shown.

Various arrangements of seals may also be used, with seals held by the coupling body, or the ends of the pipes, or the flanges or with a seal bridging the ends of the pipes. As shown in FIG. 7, if the seal is carried by the pipes or a flange on the pipes, and the pipes are spaced at their ends, the seals may be easily replaced by opening the jaws of the connector, sliding the connector along one of the pipes to expose the seals, and sliding the seals to the ends of the pipe and removing them through the space between the ends of the pipes.

Where the ends of the pipes are to be spaced apart as shown in FIG. 7, the spacing can be set by a bolt extending through coupling body 86 into the area between the pipes to set the spacing. The pipe ends are then positioned against the bolt to properly position the pipes in the coupling body with the correct spacing between them. If the sleeve is to be moved along the pipe, such as for seal replacement, the bolt would be backed out of the coupling to allow the coupling body to freely slide along the pipes.

Figure 8:
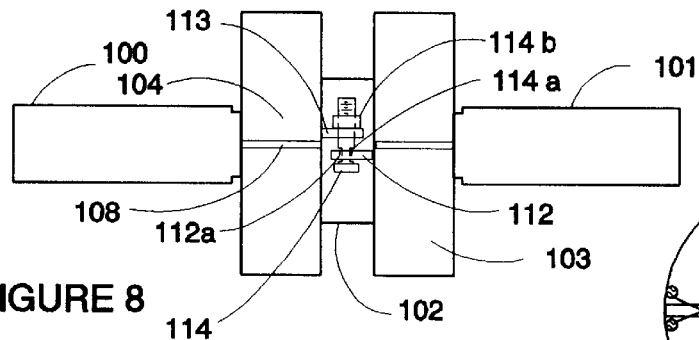
Figure 14:
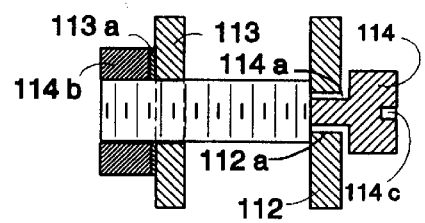

FIG. 8 shows an embodiment of the coupling of the invention wherein the jaw members 103 of the set of jaw members which hold pipe 101 are configured to be moved around the coupling body 102 between open and closed positions in the opposite direction as jaw members 104 of the set of jaw members which hold pipe 100. Thus, jaw members 103 would move circumferentially around coupling body 102 so as to move upwardly as shown in FIG. 8 to closed position and jaw members 104 would move circumferentially around coupling body 102 so as to move downwardly as shown in FIG. 8 to closed position. With this arrangement, the jaws can be locked in closed position by tightening bolt 114 to urge arm 113 extending from one of the jaw members 104 downwardly and toward arm 112 extending from one of the jaw members 103, which is urged upwardly in FIG. 8. This will keep the jaw members from rotating to open position. The spacing between jaw members is indicated as 108, but such spacing may be less than shown and practically nonexistent in the closed position shown. An arrangement of FIG. 8, an enlarged transverse section of the adjustment bolt and mounting is shown in FIG. 14, may be used to open and close the jaw members. Arm 112 may be configured so that a groove 114*a* in bolt 114 adjacent the head of bolt 114 is captured in a slot 112*a* in arm 112 so that bolt 114 may be rotated and can slide radially with respect to the coupling in the slot 112*a*, but is held against longitudinal movement with respect to arm 112. Nut 114*b* of bolt 114 may be secured, such as by welding 113*a*, to arm 133 or, alternately, bolt 114 may be threaded through arm 113. With such an arrangement, as bolt 114 is rotated in one direction, arms 112 and 113 are drawn together to move the jaw members toward closed position, and as bolt 114 is rotated in the opposite direction, arms 112 and 113 are pushed apart to move the jaw members toward open position. In a further variation, bolt 114 may be replaced with a spring to bias arms 112 and 113 together, and, thus, bias the jaw members to closed position.

Figure 9:
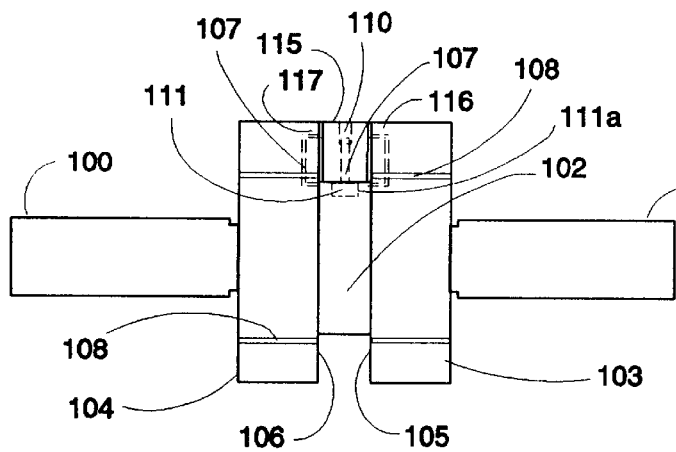
Figure 10:
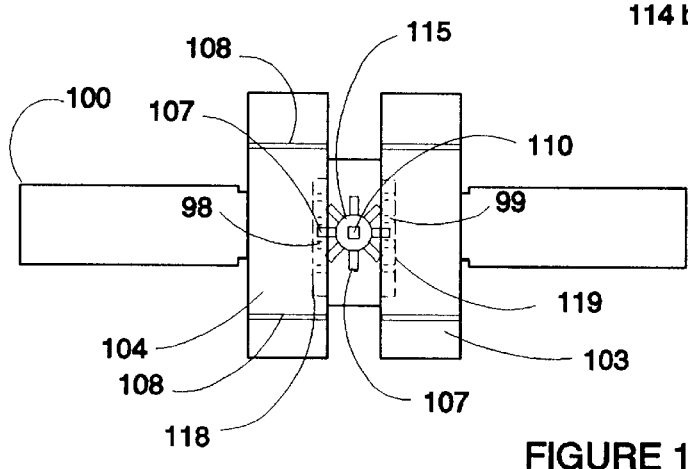

FIGS. 9 and 10 show the same jaw arrangement of FIG. 8, but show a set of opposite jaw members 103 and 104 having recesses 119 and 118, respectively, with teeth 99 and 98, respectively, spaced therein. The outer circumferences of the respective jaw members extend over recesses 119 and 118 as at 116 and 117, FIG. 9, respectively. A toothed wheel 115 is positioned between the jaw members 103 and 104 in line with recesses 119 and 118 with teeth 107 of toothed wheel 115 engaging teeth 99 and 98 in recesses 119 and 118, respectively. A stub shaft 111 extends from the bottom of toothed wheel 115 into a receiving opening 111*a* in coupling body 102 to provide an axis for rotation of toothed wheel 115, and a square opening 110 in the top of toothed wheel 115 provides a keyway for the insertion of a key with handle (not shown) by which toothed wheel 115 can be rotated. When toothed wheel 115 is rotated, the jaw members 103 and 104 are moved circumferentially around coupling body 102 in opposite directions, rotation of toothed wheel 115 in one direction causing movement of the jaw members to closed position while rotation in the opposite direction causing movement of the jaw members to open position. The jaw members can be locked in closed position, if desired, in a number of different ways.

With the top portions of recesses 119 and 118 covered as at 116 and 117, toothed wheel 115 is held in position between the respective jaw members. Alternately, recesses 118 and 119 can extend to and open to the outside surfaces of the jaw members. In such case, toothed wheel 115 can be removable and inserted when it is desired to open or close the jaw members. A locking piece to engage teeth 98 and 99 could take the place of wheel 115 when the jaw members are in desired positions. While a toothed wheel 115 is shown with mating teeth 98 and 99 in the recesses, wheel 115 could be a pinion gear with mating racks provided in recesses 118 and 119.

Figure 11:
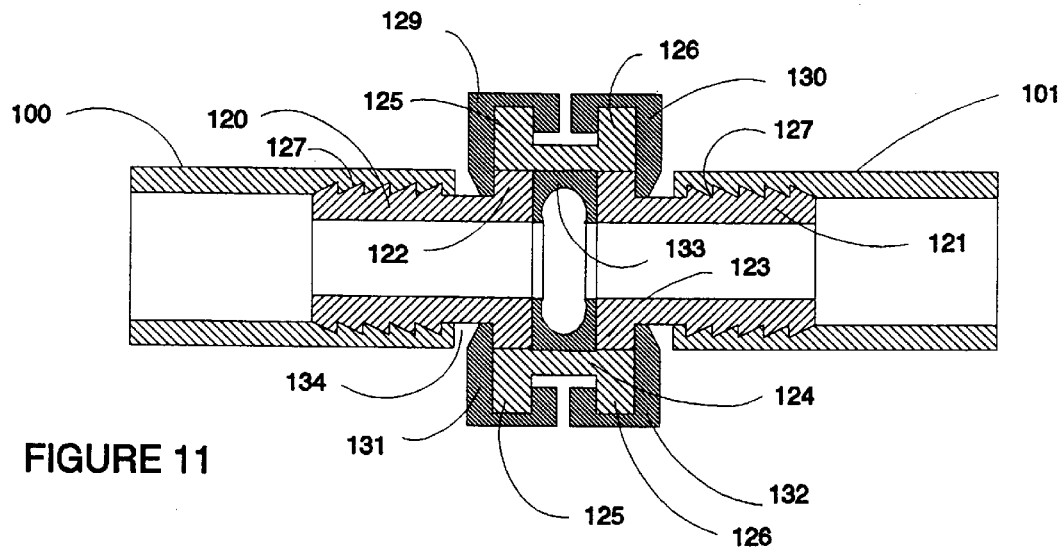
Figure 12:
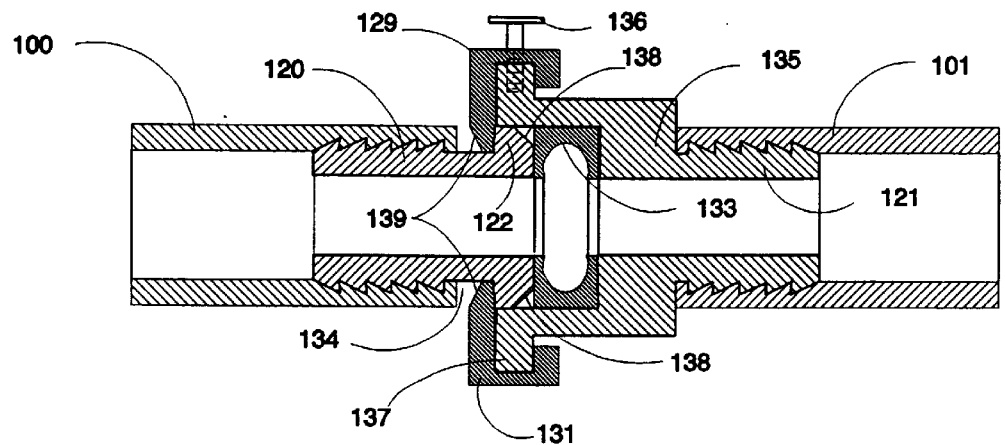

FIGS. 11 and 12 show couplings of the invention specifically adapted for use with flexible pipe or hose. As shown in FIG. 11, pipe insert 120 has a ridged end portion configured to be inserted into the end of pipe or hose 100. Pipe insert 121 has a ridged end portion configured to be inserted into end of pipe or hose 101. Ridges 127 are provided in normal manner to engage the inside of the end portions of the pipes or hoses and help prevent the inserts from sliding out of the pipes or hoses. Although not shown, hose or other clamps can be tightened in normal manner around the ends of pipes or hoses 100 and 101 to more securely position the inserts in the ends thereof. A flange 122 is provided at the end of inset 120 and flange 123 is provided at the end of inset 121 to provide the shoulders for coupling the pipes together. The coupling of the invention is shown as including coupling body 124 with flanges 125 and 126 which position jaw members 129, 130, 131, and 132 in the manner previously described. Other details and operation of the coupling is as previously described. A seal 133 is positioned between the ends of inserts 120 and 121 inside coupling body 124 to seal the coupling. Rather than ridges 127 to be slid into a pipe end, the insert could be threaded and screwed into the ends of pipes 100 and 101. The receiving pipes may be matingly internaly threaded, or, with some materials, the mating threads can be formed as the insert is screwed into the end of the pipe.

An alternate embodiment is shown in FIG. 12 wherein insert 121 has an end 135 with flange 137 integral therewith to form the mounting flange for a set of jaw members which include jaw members 129 and 131. With this arrangement, only one set of jaw members is required as the insert 121 in pipe 101 actually carries the jaw members. The flange 122 on the end of insert 120 is inserted into the end of insert 121 in line with insert flange 137 and the jaws closed to secure the pipes or hoses together. The coupling is sealed by seal 133. The jaws may be locked in closed position by screw 136. This arrangement of coupling can be used for various types of hoses or pipes being particularly useful with flexible hoses.

In some cases, particularly with the coupling of FIG. 12, but with various other embodiments also, it will be desirable to spring load the jaw members so that they are constantly urged to closed position. In such instance, a user rotates the jaw members with respect to the coupling body to move them to open position, inserts the pipe to be coupled, and releases the jaw members to allow them to move under force of the spring to closed position. In some cases, the end of the pipe or hose to be coupled, such as the end of coupling 120 along the outer edge of flange 122 can be tapered as at 138 so that, if pushed against the taper 139 of the jaw members, will cause the jaw members to move against the bias of the springs to open position and, as flange 122 passes into the end of insert 121, the jaws will move under the bias of the springs to closed position as shown in FIG. 12 to lock the pipe together.

Figure 13:
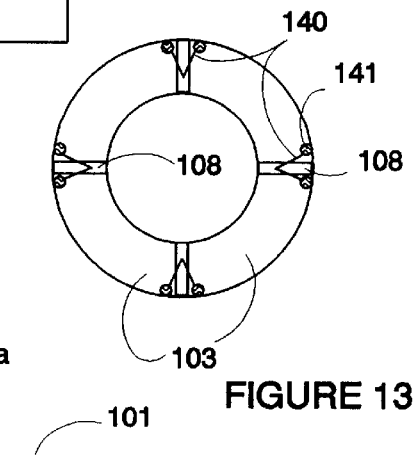

A spring arrangement for the jaws is shown in FIG. 13, with jaw members labeled 103 as in FIGS. 8–10. "U" or "V" springs 140 are positioned between adjacent jaw members across space 108 between such jaw members and have their ends secured to adjacent jaw members as at 141 so that the springs urge the jaw members together. As previously described, as the jaw members move inwardly to closed position they get closer together and the space 108 between them gets smaller. Thus, urging the jaw members together will urge them toward closed position. Springs 140 may be secured to the jaw members in any suitable manner such as by welding or by a pin or screw. Various other spring arrangements could be used, such as that previously described in connection with FIG. 8. Further, it is not necessary that a spring be provided between each jaw member. A single spring acting between two of the jaw members will be sufficient to close all jaw members as all jaw members of a set generally move together.

It has been found that the coupling of the invention can be made much smaller in outside diameter and lighter than traditional flange couplings for the same size pipe, and is easier to use than the traditional flange or screw-type couplings or other couplings such as the two piece clamp-type couplings used with pipes having grooved ends.

While the coupling of the invention has been illustrated and described with each set of jaw members including four individual jaw members, the number of jaw members in a set of jaw members can vary. Such couplings are operable with only two jaw members in a set of jaw members, or with any number of jaw members greater than two.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A coupling for attachment to the end portion of a pipe, comprising:
    a coupling body to closely receive an end portion of a pipe therein;
    a set of jaw members;
    means movably mounting the jaw members on the coupling body for movement toward the pipe when received in the coupling body with simultaneous circumferential movement partially around the pipe in one direction and for movement away from the pipe received in the coupling body with simultaneous circumferential movement partially around the pipe in the opposite direction, whereby when the jaw members of the set move toward the pipe received in the coupling body to a closed position the jaw members are adapted to secure the coupling body to the pipe and when the jaw members of the set move away from the pipe received in the coupling body to an open position the jaw members are adapted to disengage the pipe so the pipe can be removed from the coupling body; and
    means for moving the jaw members of the set with respect to the coupling body.

2. A coupling for attachment to the end portion of a pipe according to claim 1, additionally including bias means to bias the jaw members to the closed position.

3. A coupling for attachment to the end portion of a pipe according to claim 2, wherein the bias means includes at least one spring extending between at least one pair of jaw members of the set of jaw members.

4. A coupling for attachment to the end portion of a pipe according to claim 1, wherein the coupling is adapted to join two pipes in end to end relationship, and the coupling is adapted to be secured to the end of one of the pipes to be joined.

5. A coupling for attachment to the end portion of a pipe according to claim 1, wherein the coupling includes bias means to bias the jaw members to a closed position, the jaw members include jaw member tapered surfaces adapted to mate with a tapered end portion on said pipe to move the jaw members against the bias of the bias means and to allow the end portion to be moved into and to be received by the coupling body, the bias means then causing the jaw member to move to the closed position to secure the end portion in the coupling body when received therein.

6. A coupling for attachment to the end portion of a pipe according to claim 1, wherein the coupling is adapted to join two pipes each having an end in end-to-end relationship with the end portion of each pipe to be joined received in the coupling body, and including a seal with a cavity opening inwardly and having a width and having opposite seal side lips, said pipe ends adapted to be located spaced apart within the coupling body at a distance no greater than the width of the seal whereby the seal is received between the ends of the pipes to be joined with respective seal side lips adapted to engage the ends of the pipes.

7. A coupling for attachment to the end portion of a pipe according to claim 6, wherein the coupling body has inside diameters to closely receive the end portions of the pipes to be joined, wherein the seal is of a ring configuration with an outside diameter, and wherein the outside diameter of the seal is closely received within the coupling body and adapted to be located between the pipe ends.

8. A coupling for attachment to the end portion of a pipe according to claim 7, wherein the lips of the seal have inside diameters, and wherein the inside diameter of a lip of the seal is adapted to be approximately equal to the inside diameter of the pipe the end of which the seal lip is against.

9. A coupling for attachment to the end portion of a pipe according to claim 1, wherein the coupling body includes an internal shoulder therein, wherein the pipe to which the coupling is to be attached has an end and an end portion that is received within the coupling body with the pipe end adjacent to but spaced from the internal shoulder, and including a seal with a cavity opening inwardly and having a width and having opposite seal side lips, said pipe end adapted to be spaced from the internal shoulder a distance no greater than the width of the seal whereby the seal is adapted to be received between the end of the pipe and the internal shoulder with seal side lips against the end of the pipe and the internal shoulder, respectively.

10. A coupling for attachment to the end portion of a pipe according to claim 9, wherein the coupling body has an inside diameter to closely receive the end portion of a pipe to which it is to be attached, wherein the seal is of a ring configuration with an outside diameter, and wherein the outside diameter of the seal is adapted to be closely received within the coupling body between the shoulder and pipe end.

11. A coupling for attachment to an end portion of a pipe wherein the coupling is adapted to join two pipes in end to end relationship with each pipe having an end portion and a groove in the end portion forming a shoulder spaced from and facing away from the end of the pipe, comprising:

a coupling body to closely receive an end portion of each of two pipes to be joined in end to end relationship and to extend over the end portion of each said pipe when said pipe is received in the coupling body;

a set of jaw members;

means movably mounting the jaw members on the coupling body for movement toward the end portion of one of the two pipes to be joined when said pipe is received in the coupling body with simultaneous circumferential movement partially around the one end portion of the pipe in one direction and movement away from the one end portion of the pipe received in the coupling body with simultaneous circumferential movement partially around the one end portion of the pipe in the opposite direction, whereby when the jaw members of the set move toward the one end portion of the pipe received in the coupling body to a closed position the jaw members are adapted to engage the groove therein to secure the coupling body to the one end portion of the pipe and when the jaw members of the set move away from the one end portion of the pipe received in the coupling body to an open position the jaw members are adapted to disengage the groove therein so the one end portion of the pipe can be removed from the coupling body;

means for moving the jaw members of the set with respect to the coupling body;

a second set of jaw members;

means movably mounting the second set of jaw members on the coupling body spaced from the set of jaw members and for movement toward the end portion of the other of the two pipes to be joined when said other of the two pipes to be joined is received in the coupling body with simultaneous circumferential movement partially around the end portion of the other pipe in one direction and movement away from the end portion of the other pipe received in the coupling body with simultaneous circumferential movement partially around the end portion of the other pipe in the opposite direction, whereby when the jaw members of the second set move toward the end portion of the other pipe received in the coupling body to a closed position the jaw members are adapted to engage the groove therein to secure the coupling body to the end portion of the other pipe and when the jaw members of the second set move away from the end portion of the other pipe received in the coupling body to an open position the jaw members are adapted to disengage the groove therein so the end portion of the other pipe can be removed from the coupling body; and means for moving the jaw members of the second set with respect to the coupling body.

12. A coupling for attachment to the end portion of a pipe according to claim 11, additionally including bias means to bias the jaw members to the closed position.

13. A coupling for attachment to the end portion of a pipe according to claim 12, wherein the biasing means includes a spring extending between a jaw member of the set of jaw members and a jaw member of the second set of jaw members.

14. A coupling for attachment to the end portion of a pipe according to claim 11, wherein the means for moving the jaw members includes teeth associated with a jaw member of the set of jaw members, teeth associated with an opposite jaw member of the second set of jaw members, and a wheel with mating teeth extending therefrom rotatably positioned between the respective jaw members of the set of jaw members and second set of jaw members having associated teeth so that rotation of the wheel will cause the jaw members of the set of jaw members and second set of jaw members to move simultaneously between the open and closed positions.

15. A coupling for attachment to the end portion of a pipe according to claim 11, wherein the means for moving the jaw members includes a first bracket means extending from a jaw member of the set of jaw members, a second bracket means extending from a jaw member of the second set of jaw members, and adjustment means extending between the first bracket means and the second bracket means to adjust the distance between the first bracket means and the second bracket means to thereby move the respective sets of jaw members between the open and closed positions.

16. A coupling for attachment to the end portion of a pipe according to claim 15, wherein the adjustment means is a bolt freely rotatably mounted in one of the first bracket means or the second bracket means and threadedly received in the other of the first bracket means or the second bracket means.

17. A releasable pipe coupling comprising:

a pipe having an end portion of the pipe to which the coupling is to be attached;

a coupling body to closely receive the end portion of the pipe therein;

a set of jaw members;

means movably mounting the jaw members on the coupling body for movement toward the end portion of the pipe when received in the coupling body with simultaneous circumferential movement partially around the pipe in one direction and for movement away from the end portion of the pipe received in the coupling body with simultaneous circumferential movement partially around the pipe in the opposite direction, whereby when the jaw members of the set move toward the end portion of the pipe received in the coupling body to a closed position the jaw members secure the coupling body to the pipe and when the jaw members of the set move away from the end portion of the pipe received in the coupling body to an open position the jaw members disengage the pipe so the pipe can be removed from the coupling body; and means for moving the jaw members of the set with respect to the coupling body.

18. A releasable pipe coupling according to claim 17, wherein the end portion of the pipe is an end portion piece secured to the pipe.

19. A releasable pipe coupling according to claim 18, wherein the pipe is a flexible hose.

20. A releasable pipe coupling according to claim 19, wherein the coupling is secured to a flexible hose.

* * * * *